United States Patent [19]
Martuch

[11] 3,831,309
[45] Aug. 27, 1974

[54] FISHING LEADER
[75] Inventor: Leon L. Martuch, Midland, Mich.
[73] Assignee: Scientific Anglers, Inc., Midland, Mich.
[22] Filed: June 1, 1972
[21] Appl. No.: 258,631

[52] U.S. Cl. ............................................. 43/44.98
[51] Int. Cl. ............................................ A01k 91/00
[58] Field of Search .................................. 43/44.98

[56] References Cited
UNITED STATES PATENTS
3,453,769   7/1969   Chandler .......................... 43/44.98

Primary Examiner—Louis G. Mancene
Assistant Examiner—J. Q. Lever
Attorney, Agent, or Firm—Laurence, Laurence & Neilan

[57] ABSTRACT

A fly fishing leader having a loop at the tippet end of the butt section on which different diameter tippet sections can be tied.

10 Claims, 2 Drawing Figures

FISHING LEADER

This invention relates to an improved fly fishing leader. This invention further relates to an improved fly fishing leader having a loop at the forward end of the butt section upon which can be tied various diameter tippet sections.

A leader used in fly fishing has many functions including the transmission of energy, inparted by the fishing line, to the fly; permitting the fly to drop more gently on the water than is possible if the fly was attached to the fishing line; and being less visible and therefore less distracting to the fish than would be a fishing line.

Commercially available leaders are usually tapered and may be either knotless or have several sections joined together. The diameter of the leader decreases from the diameter appropriate for the diameter of the fishing line to a diameter at the tippet section which is appropriate for the fly being used. The diameter of the leader butt is usually approximately two-thirds to three-fourths the diameter of the line tip.

For leaders composed of several sections, the tapering effect is accomplished by the tying together of several sections, each section having a progressively smaller diameter. In order to obtain a secure knot between each adjacent section the diameters of the two sections should not exceed a difference of about 0.003 inches. This places a severe limitation on which section can be joined and also requires a great number of sections if the diameters of the fishing line and the desired tippet section is greatly different.

Sections having greater differences (greater than about 0.003 inches) may be joined using specialized knots, which are clumsey to use and not universally known especially to the amateur fisherman.

When a sportsman, utilizing a "knotted" leader wishes to change the fly which he is using, he must in many cases, cut off the tippet section and attach a new tippet section. If the new tippet has a diameter difference which is greater than about 0.003 inches, he must either add or subtract sections as required. Even if no addition or removal of sections is required, the cutting of the tippet section and, through necessity the accompaning knot, shortens the previous section. Eventually this section must also be replaced and eventually the entire leader.

For a "knotless" leader, the leader is tapered from the diameter of the fishing line to the diameter of the tippet section required for attachment of the desired fly. The changing of a fly with this type of leader requires the changing of the entire leader or guessing at which point the leader must be cut in order to add a new tippet section. The leader is thus no longer a "knotless" leader. Neither of the above courses of action is desirable.

It has now been found that by the formation of a loop at the end of the butt section, various diameter tippet sections can be attached to the loop thus forming an easily interchangeable leader which meets the requirements of a good leader and efficiently transmits the required energy from the fishing line to the fly. This arrangement permits the use of tippet sections having a diameter greater or less than the diameter of the leader at the loop area. The utilization of such a wide range of diameters is contrary, as will be discussed, to the theory and practice presently prevailing in the industry.

It is thus an object of this invention to overcome the disadvantages enumerated above.

Another object of this invention is to provide an improved leader consisting of two sections — a butt section and a tippet section.

Another object of this invention is to provide an improved leader in which the butt section will support a range of tippet diameters both larger and smaller than the diameter of the butt section at the tippet end.

A further object of this invention is to provide an improved leader in which the tippet section can be changed without shortening the butt section.

A still further object of this invention is to provide an improved leader in which the same simple knot can be utilized to attach the tippet section to the loop as well as the fly to the end tippet section.

A still further object of this invention is to provide an improved leader having a loop at the tippet end of the butt section to which tippets are tied.

Further objects and advantages of this invention will be apparent from the following description and drawings.

Figure 1:
FIG. 1 is a drawing of the leader of this invention showing the spatial relationship of the butt section, the loop and the tippet section. The diameter of the sections are not drawn to scale.

In FIG. 1 the butt end of the leader 1 is tapered from the free end to the loop section 2. The tippet section 3, is attached to the loop by a knot 5 thus making possible the freeing of the tippet section without any damage or shortening of the butt section or loop.

As was discussed previously one of the functions of a leader is to efficiently transmit the energy from the fishing line to the fly. The fly itself is generally incapable, because of its size and weight to impart the necessary energy to a line for a cast. The required energy must therefore be transmitted from the rod through the line to the leader. The commonly accepted theory, prior to now, was that the leader must be tapered or level in order to properly and efficiently transmit this energy. As a consequence there could not be any alternation or "reversal" in the diameter of the leader sections — i.e., if the butt section was tapered the tippet section must continue the taper. Its diameter could not be increased over the diameter of the forward end of the butt section.

With the present invention, this no longer is necessary since the diameter of the tippet section may be either larger or smaller than the forward end of the butt section.

Another distinct advantage of utilizing the leaders of the present invention is that it permits the use of a butt section which may be balanced for the rod and fishing line being used by the sportsman. The weight, or lack of weight, of the tippet section would be insufficient to "unbalance" the unit since the butt section is the portion which has the balanced weight. Having a balance unit would mean that the fishing line and leader is of the proper weight for the rod and thus ensures the maximum and efficient transmission of the energy from the rod to the fly. This also means that a sportsman need attach only one leader butt section to his line, a leader butt section which is balanced for the line, and then he can just change the tippet section throughout the season.

Utilizing the present invention, a sportsman may use a level section as the tippet section. As the sportsman interchanges flies a small section of the tippet section is detached with the fly being replaced. Eventually the length of the tippet section becomes too small and must be replaced. With a level tippet section the sportsman knows the diameter of the line throughout the entire length of the tippet section. Also since the diameter of the tippet section may be dependant on the fly size and not necessarily on the butt section diameter it means that the taper of the tippet section is not required and all the sportsman need have is a spool of the proper diameter tippet material from which he can cut off lengths as required.

The diameter of the loop at the end of the butt section should preferably be as small as possible while still being sufficiently large to conveniently tie the tippet section to the loop. An inside diameter in the range of about 0.005 to 0.015 inches should be sufficient for most types of fishing. This permits the use of a tippet section of a diameter in the range of about 0.005 to 0.015 inches. Other loop diameters, outside this range, can also be utilized if needed for specific occasions, but would not be required for the majority types of fishing.

Leaders are normally and preferably monofilament prepared from nylon, dacron, silk or other suitable material. The core of the monofilament leader is preferably nylon.

The leader may also be multifilamentous, of the same material as the monofilament leader. A multifilament line, because of its method of manufacture, has usually a larger diameter than a monofilament line. Multifilamentous lines, if used, therefore are utilized mainly for the butt section of the leader and seldom for the tippet section. In the specification and claims multifilamentous will, for convenience, refer to both monofilament and multifilament cores.

Leaders are preferably coated and normally tapered. The coating and tapering process is by conventional means.

The surface coating may be any of the conventional coating known to those skilled in the art and may be applied directly to the line core or over an intermediate primer.

Suitable primers should be compatible with the plastisol used as the outer coating and preferably relatively non-viscous. This includes, but is not limited to, vinyl chloride-vinyl acetate copolymers in methyl ethyl or methyl isobutyl ketone.

In coating a line, the primer is applied to the line and the solvent evaporated, and then the surface coating plastisol applied and cured.

The polymeric component of the plastisol may be vinyl chloride or vinyl chloride copolymer. This component is generally mixed with one or more plasticizers and a stabilizer.

Stabilizers which may be utilized include, but are not limited to, lead, zinc and cadmium soaps, epoxides and the like. Stabilizers are usually added to remove any hydrogen chloride which may be formed and which, if not removed, will deteriorate the surface coating.

Plasticizers for vinyl chloride polymers and copolymers include di-octyl adipate, di-2-ethylhexyl phthalate, dicapryl phthalate, tricresyl phosphate and trioctyl phosphate. The plasticizer concentration in a plastisol is usually in the range of about 30 to 70 parts by weight of plasticizer per 100 parts by weight of the polymeric component.

Curing of the plastisol is usually by a heat treatment in the range of about 350° to 380°F.

A typical surface coating plastisol formulation, in parts by weight, is as follows:

| | |
|---|---|
| polyvinyl chloride (Geon 121) | 100 |
| dioctyl adipate | 53 |
| epoxidized tall oil (Flexol EP8) | 10 |
| lead soap | 3 |

In applying the coating, the line is passed through a bath containing the plastisol at a rate which will ensure the adherence to the line of the approximate thickness of coating desired. The line is then passed through an orifice or between grooved wheels which removes the excess coating and, by a changing of orifice diameter or by a rotation of the grooved wheel, tapers the line as required. For a level line the orifice diameter remains constant and only the excess coating is removed. The coated line is then heat treated to cure the plastisol.

Figure 2:
FIG. 2 is an embodiment of this invention showing means for attachment to a fishing line.

Another embodiment of this invention is illustrated by FIG. 2 which combines the leader with a means for attaching the leader to the fishing line.

The nail knot which is fully described in copending application Ser. No. 163,357 filed July 16, 1971 by Leon L. Martuch and Donald L. Schmidt now U.S. Pat. No. 3,738,692 provides a convenient means for attaching the leader to the line. Prior to my co-pending application it was not possible to obtain a stable pre-tied, untightened nail knot. In my co-pending application it is described how the application of a surface coating or a shrink tubing to the loops and between the loops in the surface area or an internal support, which extends through the center of the knot would cause the loops to retain their "upright" configuration and prevent collapse of the knot. This knot is shown as element 4, in FIG. 2, of the present invention.

Surface coatings for the nail knot should be sufficiently rigid to support the loops in relation to each other and to retain the loop configuration. The surface coating should, at the same time, be sufficiently fragile to crumble, break apart or separate from the loops when the knot is tightened. Examples of surface coatings include waxes, inorganic plastics and cements and thermoplastic resins.

The nail knot is wound on an internal support and then coated. After "curing" of the coating the internal support is removed.

Internal supports for a nail knot may be rigid (must be removed prior to tightening knot) or flexible (may or may not be retained when knot is tightened).

Suitable materials for internal supports include polyethylenes, polyvinyl chlorides, aluminum or steel. This attachment means provides a strong junction between line and leader, which is easily made by both amateur and experienced fishermen. This means of attachment is such that no hindrance (loss) of energy occurs between the fishing line and the leader. Since the leader of this invention is also an excellent transmitter of energy, the necessary energy is imparted to the fly.

From the above discussion, it is apparent that the loop may also appear at the butt end of the tippet section and the tippet might be attached to the butt section by tying the butt section through the loop. This alternative is impractical and does not have the advantages of the present invention. Each tippet section that is used would have to have a loop instead of just one loop on the tippet end of the butt section of the leader. In changing tippet sections, the knot on the leader must also be cut thus shortening the leader. This in effect is what happens with the presently available knotted leaders. This modification offers none of the advantages shown by the present invention.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

I claim:

1. Apparatus comprising a fly fishing line leader having a butt section and a tippet section, a loop formed at one end of said butt section, said tippet section having one end extending through said loop, and a knot at said one end of said tippet section securing said tippet section to said loop, whereby said tippet section can be removed and replaced without reducing the length of said butt section.

2. Apparatus according to claim 1, wherein said leader has a multifilamentous core.

3. Apparatus according to claim 1, in which said loop has an inside diameter of about 0.005 to 0.0015 inches.

4. Apparatus according to claim 1, wherein said leader comprises a nylon core within a synthetic resin coating.

5. Apparatus according to claim 1, wherein said butt section progressively decreases in diameter toward said loop.

6. Apparatus according to claim 5, wherein said tippet section has a substantially uniform diameter.

7. Apparatus according to claim 1, further comprising a fly fishing line secured to the other end of said butt section.

8. Apparatus according to claim 7, further comprising securing means on said butt section for securing said fly fishing line to said butt section.

9. Apparatus according to claim 8 wherein said securing means comprise a pretied nail knot positioned on said butt section adjacent said other end thereof.

10. Apparatus according to claim 7, wherein the inner diameter of said loop is of a size to enable said tippet section to freely pass through said loop when being secured thereto.

* * * * *